Feb. 17, 1959
B. F. VOGELAAR ET AL
2,873,567
ADJUSTABLE REEL MOUNT FOR HARVESTER
Filed March 4, 1957
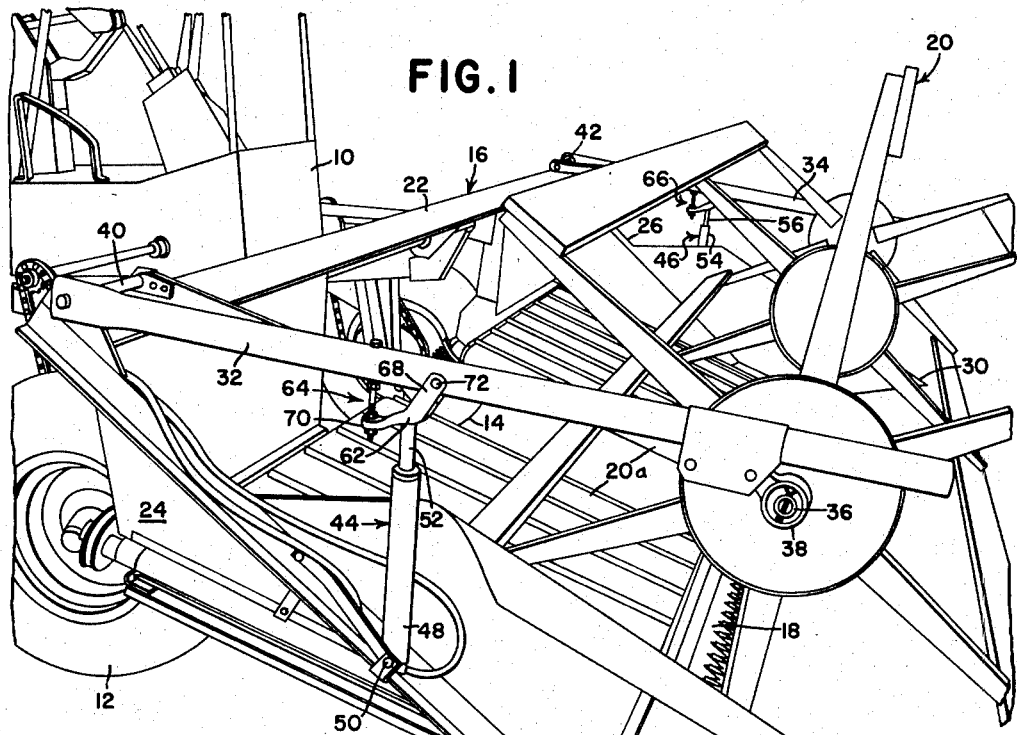
FIG. 1
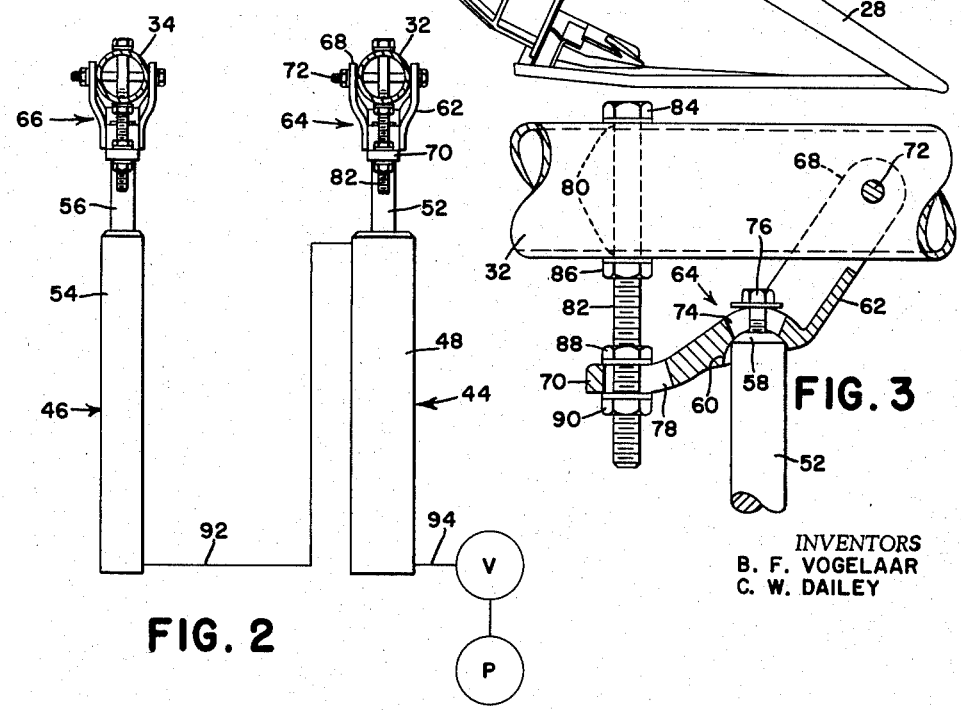
FIG. 2
FIG. 3
INVENTORS
B. F. VOGELAAR
C. W. DAILEY

United States Patent Office 2,873,567
Patented Feb. 17, 1959

2,873,567

ADJUSTABLE REEL MOUNT FOR HARVESTER

Bernard F. Vogelaar and Carl W. Dailey, Moline, Ill., assignors, by mesne assignments, to Deere & Company, a corporation of Delaware Application March 4, 1957, Serial No. 643,687

11 Claims. (Cl. 56—221)

This invention relates to a harvester and more particularly to means for adjustably mounting the harvesting reel thereon.

In a typical harvester, a rotating reel is mounted above conventional cutting mechanism and is adjustable to vary the height thereof above the cutting mechanism. Various types of mechanisms have been provided for accomplishing this adjustment but there has heretofore existed a need for improvements tending to simplify constructions of this nature. It is therefore a principal object of the present invention to fill this need by an adjustable reel mounting including means for simultaneously adjusting both ends of the reel, together with means for independently varying the relationship of one end of the reel to its adjusting means. It is a further feature of the invention to utilize a pivoted element arranged relative to a pivoted reel support and a pivoted adjusting means in such manner as to accommodate changes in the positions of the parts as they move around their relative pivots. Further objects of the invention exist in the adaptation of the structure to the employment of conventional components, the use of a simple part in each adjusting mechanism that may be readily constructed and easily installed, and such other features and advantages as will appear from the following disclosure of a preferred embodiment of the invention as illustrated in the accompanying sheet of drawings, the several figures of which are desscribed immediately below.

Fig. 1 is a fragmentary perspective of the right hand front portion of a harvester embodying the reel adjusting mechanism.

Fig. 2 is a schematic illustration, on a somewhat enlarged scale and partly in section as seen from the rear.

Fig. 3 is a fragmentary enlarged longitudinal section showing the relationship between the reel support, the intervening element and the extendible and retractable part of the proximate adjusting means.

The harvester chosen for purposes of illustration is of the windrower type and comprises a mobile chassis 10 carried on right and left hand front wheels 12 and 14, the expressions "right" and "left" being used here with reference to the position of a person standing behind the machine and facing forwardly. The harvester or windrower structure itself, apart from the chassis 10, comprises a main frame 16 disposed transverse to the line of advance and including at its leading edge transverse cutting mechanism 18. The cutting mechanism is conventional, as is its general relationship to a transverse rotatable reel 20, which operates to move cut crops rearwardly onto a pair of inwardly running conveyors 20a.

The windrower frame 16 comprises a transverse rear wall structure 22 having opposite right and left hand ends 24 and 26 respectively which comprise wall structure extending forwardly respectively as right and left hand divider shields 28 and 30, thus affording supporting structure on the frame above which right and left hand reel supports 32 and 34 extend to support at their forward ends a transverse reel shaft 36 on which the reel 20 is carried. Appropriate shaft-supporting bearings, such as that shown at 38 at the right hand end of the reel, are used to mount the reel on the supports. The rear ends of the supports are pivotally connected to the transverse wall structure 22 of the harvester frame 16 on transverse pivots respectively at 40 and 42. These pivots are of course transversely coaxial and mount the supports for movement vertically so that the height of the reel 20 relative to the cutting mechanism 18 may be varied.

The mechanism for adjusting the reel comprises right and left hand force-exerting means, here in the form of hydraulic units or motors 44 and 46. The right hand motor comprises a cylinder 48 disposed in a generally upright position and having its lower end pivotally connected at 50 to a lower portion of that part of the harvester frame structure made up of the right hand end wall 24. The motor further includes a piston (not shown) having a piston rod 52 which extends upwardly as a selectively extendible and retractable force-transmitting member. The left hand motor is similarly arranged, including a cylinder 54 and piston rod 56. The lower end of the left hand cylinder 54 is pivotally connected to the lower portion of the end wall structure 26 in a manner similar to that shown at 50, but not visible in the drawings.

As best shown in Fig. 3, the free or upper end portion of the piston rod 52, as at 58, is generally hemispherical or otherwise configured to complement a socket 60 in a connector element 62 that forms part of right hand connecting means 64. A similar connecting means 66 is provided at the opposite side of the machine. Since both connecting means are the same, only one will be described.

The connector element 62 has first and second opposite ends 68 and 70, the former being bifurcated to receive or straddle the support 32 from below and being pivoted to the support on a transverse axis by a transverse pivot 72. The element is slotted or apertured intermediate its ends by a slot 74 which runs lengthwise as respects the length of the support 32. This slot opens upwardly as well as downwardly to the socket 60 and securing means in the form of a cap screw 76 is passed through the slot and is threaded into a tapped bore (not shown) in the upper end 58 of the piston rod 52. The rear end portion 70 of the element 62 is likewise apertured or slotted by a fore-and-aft slot 78 which is in vertical register with a pair of vertically alined apertures 80 in the support 32. An elongated vertical screw member 82, together with other parts to be presently described, comprises an adjusting device cooperative between the support 32 and the element 62 for varying the vertical spacing between the end 70 and the support. The screw 82 is headed at 84 and the head abuts the top of the support 32. A lock nut 86 is threaded on the member 82 and abuts the bottom of the support. The free end portion of the member passes loosely through the slot 78 in the element 62 and upper and lower lock nuts 88 and 90 respectively engage above and below the end 70.

The connecting means 66 at the opposite side of the machine, as already stated, is identical or at least symmetrical to that just described. In normal adjustment of the reel, it may be assumed that both units 44 and 46 are connected at opposite ends to the respective support structures 24—32 and 26—34 and, if the mechanisms are correctly adjusted, vertical adjustment of the reel should be properly achieved; that is to say, the reel in any of its adjusted positions should remain level as respects the cutting mechanism 18. For the purpose of effecting simultaneous adjustment of the motors or units 44 and 46, the two motors are connected in series as by a fluid line 92 which runs from the upper end of the cylinder 48 to the lower end of the cylinder 54. A suitable source of fluid under pressure, as a pump P, supplies fluid to the lower end of the cylinder 48 via a valve V and a fluid line 94. Because of the volumetric difference between the rod side of the piston in the motor 48 and the head side of the piston in the motor 46, the cylinder 48 is proportionately larger than the cylinder 54 so as to achieve relatively accurate simultaneous movement of the piston rods 52 and 56.

For various reasons, the reel may get out of level as respects the cutting mechanism and it is therefore in this respect that the connecting means 64 and 66 become important. For example, the motors may be extended to any particular height and the level of the reel may be checked. If it is found to be out of level, one or the other of the connecting means may be adjusted. For example, and assuming that it is the right hand connecting means 64 that is to be adjusted, the nuts 88 and 90 are loosened, as the case may be, to vary the spacing between the support 32 and the end 70 of the element 62. This will of course vary the vertical relationship between the support 32 and the temporarily fixed piston rod 52. Proper adjustment will secure accurate leveling of the reel, after which the nuts 88 and 90 may be tightened. Because of the generally hemispherical configuration of the end 58 of the piston rod 52 and its reception by the socket 60 in the element 62, the necessary rocking motion is effected. During adjustment, the connector element 62 will swing vertically about its pivot pin 72, the unit 44 will swing fore-and-aft about its transverse pivot 50 and the support 32 will swing vertically about its transverse pivot 40. The same will be true with reference to corresponding parts in the connecting means 66.

Thus there has been provided a simple and inexpensive reel-adjusting means, including provision for adjustment of either end of the reel independently of the other so as to secure proper leveling of the reel. Features and advantages not categorically enumerated herein will undoubtedly occur to those versed in the art, as will many modifications and alterations in the preferred embodiment illustrated, all of which may be achieved without departure from the spirit and scope of the invention.

What is claimed is:

1. Reel adjusting mechanism for a harvester having a frame and cutting mechanism carried thereby and a reel disposed over the cutting mechanism and supported at opposite ends respectively by a pair of reel supports vertically movably connected to the frame, comprising: a pair of force-exerting means carried by the frame respectively adjacent to the reel supports, each unit including a selectively vertically extendible and retractable force-transmitting member having a free end portion adjacent to the respective reel support; means for simultaneously actuating the force-exerting means to simultaneously extend or retract the force-transmitting members; a pair of means respectively connecting the unit members at their end portions to the reel supports, each connecting means including a connector element having a first end including a horizontal pivot to the associated reel support, an intermediate portion connected in force-receiving relation to the end portion of the associated member, and a second end portion spaced below the respective reel support, and each connecting means further including an adjusting device between the respective reel support and the second end portion of the associated connector element for swinging the connector element about its pivot to the reel support and thereby to vary the spacing between said reel support and the second end portion of said associated connector element whereby the reel supports may be selectively adjusted vertically independently of each other and independently of the force-exerting means.

2. The invention defined in claim 1, in which: the end portion of each force-transmitting member is generally hemispherical, and the intermediate portion of each connector element includes a socket receiving the associated hemispherical end portion.

3. The invention defined in claim 2, in which: the intermediate portion is additionally formed with a slot therethrough and opening to the socket, said slot is elongated normal to the pivot of the element to its support, and a securing member passes loosely through the slot and into the end portion of the associated force-transmitting member.

4. In combination: an elongated horizontal support; an upright member having a free end spaced below the support; a connector element having an intermediate portion seating on the end of the member and first and second ends extending to opposite sides of said intermediate portion in the general direction of the support, said first end having furcations straddling the support and said second end being spaced from the support; pivot means transverse to the support and connecting the element furcations to the support for vertical swinging of the element; and adjustable means interconnecting the support and the second end of the element for swinging of the element about the pivot means to vary the spacing between the support and the end of the member.

5. The invention defined in claim 4, in which: the free end of the element has a vertical aperture therein, the support has a vertical aperture therethrough in vertical register with the element aperture, and the adjusting means comprises a headed screw passed downwardly through the support and element apertures with its head abutting the top of the support, a lock nut threaded on the screw and engaging the bottom of the support, and upper and lower nuts threaded on the screw and respectively engaging the top and bottom of the second end of the element.

6. In combination: an elongated horizontal support; an upright member having a free end spaced below the support; a connector element having an intermediate portion seating on the end of the member and first and second ends extending to opposite sides of said intermediate portion in the general direction of the support; pivot means transverse to the support and connecting the first end of the element to the support for vertical swinging of the element; and adjustable means interconnecting the support and the second end of the element for swinging of the element about the pivot means to vary the spacing between the support and the end of the member.

7. The invention defined in claim 6, in which: the free end of the element has a vertical aperture therein, and the adjusting means comprises a vertical screw carried by the support and passed downwardly through the element aperture, and upper and lower nuts threaded on the screw and respectively engaging the top and bottom of the second end of the element.

8. In combination: a fore-and-aft frame; a first pivot transverse to the frame at a rear part thereof; a second pivot on the frame ahead of and at a level below that of the first pivot; a fore-and-aft support having a rear portion connected to the frame on the first pivot and extending forwardly in spaced relation above the second pivot; a generally upright selectively vertically extendible and retractible unit having a lower end connected to the frame on the second pivot and an upper end spaced below the support; a connector element seated on the upper end of the unit for rocking about a transverse axis and extending forwardly to a forward end and rearwardly to a rear end spaced from the support; a third pivot connecting the element at its forward end to the support on a transverse axis; and vertically adjustable means connecting the rear end of the element to the support for fixing the element to the support in selected positions of adjustment of said element about said third pivot.

9. In combination: a fore-and-aft frame; a first pivot transverse to the frame at a rear part thereof; a second pivot on the frame ahead of and at a level below that of the first pivot; a fore-and-aft support having a rear portion connected to the frame on the first pivot and extending forwardly in spaced relation above the second pivot; a generally upright selectively vertically extendible and retractible unit having a lower end connected to the frame on the second pivot and an upper end spaced below the support; a connector element seated on the upper end of the unit for rocking about a transverse axis and extending forwardly to a forward end and rearwardly to a rear end spaced from the support; a third pivot connecting the element at one end to the support on a transverse axis; and vertically adjustable means connecting the other end of the element to the support for fixing the element to the support in selected positions of adjustment of said element about said third pivot.

10. The invention defined in claim 9, in which: the upper end of the unit is generally hemispherical, and the connector element has an under portion in the form of a socket seating on said upper end.

11. The invention defined in claim 10, in which: the socketed portion of said element has a fore-and-aft slot therein opening upwardly through the element and opening downwardly to the socket; and a securing member passed loosely through the slot and into the upper end of the unit.

References Cited in the file of this patent
UNITED STATES PATENTS

| | | |
|---|---|---|
| 2,319,458 | Hornish | May 18, 1943 |
| 2,413,380 | Rush et al. | Dec. 31, 1946 |
| 2,513,906 | Acton | July 4, 1950 |
| 2,603,054 | Hume | July 15, 1952 |
| 2,689,443 | Magee | Sept. 21, 1954 |